(12) United States Patent
Terakawa et al.

(10) Patent No.: US 7,150,908 B2
(45) Date of Patent: Dec. 19, 2006

(54) CONDUCTIVE BELT

(75) Inventors: Katsumi Terakawa, Hyogo (JP); Shunichi Yabushita, Hyogo (JP); Masakazu Tanaka, Hyogo (JP); Jun Ochi, Hyogo (JP)

(73) Assignee: Sumitomo Rubber Industries, Ltd, Kobe (JP)

( * ) Notice: Subject to any disclaimer, the term of this patent is extended or adjusted under 35 U.S.C. 154(b) by 256 days.

(21) Appl. No.: 10/617,711

(22) Filed: Jul. 14, 2003

(65) Prior Publication Data

US 2004/0013863 A1   Jan. 22, 2004

(51) Int. Cl.
  *B32B 27/32* (2006.01)
  *G03G 15/00* (2006.01)
  *G03G 15/01* (2006.01)
  *G03G 15/20* (2006.01)

(52) U.S. Cl. .............. 428/220; 428/213; 399/302; 399/308; 399/303; 399/312; 399/162

(58) Field of Classification Search ............. 428/220, 428/213, 215; 399/302, 308, 303, 312, 162
See application file for complete search history.

(56) References Cited

U.S. PATENT DOCUMENTS 5,942,301 A * 8/1999 Schlueter et al. ............ 428/58
5,978,638 A * 11/1999 Tanaka et al. ............. 399/302
6,852,400 B1 * 2/2005 Nakazawa et al. .......... 428/220

FOREIGN PATENT DOCUMENTS

JP   7-295391 A   11/1995
JP   2000-10417 A   1/2000

* cited by examiner

*Primary Examiner*—Rena Dye
*Assistant Examiner*—Lawrence Ferguson
(74) *Attorney, Agent, or Firm*—Birch, Stewart, Kolasch & Birch, LLP

(57) ABSTRACT

A conductive belt having a base layer (3) electroconductive and made of a resin, an intermediate layer (5) ionic-conductive and made of an elastomer, and a surface coating layer (7). The base layer (3) has a tensile modulus of elasticity of not less than 500 Mpa and a volume electric resistance value not less than $10^6$ Ω·cm nor more than $10^{11}$ Ω·cm. The intermediate layer (5) has a JIS A hardness less than 70, a thickness not less than 50 μm nor more than 600 μm, and a volume electric resistance value not less than $10^8$ Ω·cm nor more than $10^{14}$ Ω·cm.

12 Claims, 3 Drawing Sheets

# CONDUCTIVE BELT

BACKGROUND OF THE INVENTION

1. Field of the Invention

The present invention relates to a conductive belt and more particularly to a conductive belt that is used suitably as a seamless intermediate transfer belt in image-forming apparatuses such as a copying machine, a printer, a facsimile, and the like.

2. Description of the Related Art

To impart an electrical conductivity to the transfer belt for use in the copying machine, the printer, and the like, the following two methods are conventionally used: In one of them, an electroconductive rubber containing a conductive filler is used for the transfer belt. In the other of them, an ionic-conductive rubber such as urethane rubber, acrylonitrile butadiene rubber (NBR), and epichlorohydrin rubber is used for the transfer belt.

In the conductive belt using the electroconductive rubber containing the conductive filler, it is difficult to disperse the conductive filler uniformly in the electroconductive rubber. Thus the electric resistance value varies according to a portion of the conductive belt. Therefore in the recent tendency, the ionic-conductive rubber is used more than the electroconductive rubber in the copying machine, the printer and the like required to have a high image quality by using digital image processing technique and color image processing technique.

To reduce a variation in the belt speed to cope with a high-speed operation of the printer and the like in recent years, the transfer belt is required to have a high elastic modulus. To allow the transfer belt to have a high elastic modulus, resins such as polyimide, PVDF, polycarbonate, and the like are used for the transfer belt.

A transfer belt of three-layer structure is disclosed in Japanese Patent Application Laid-Open No. 7-295391. More specifically, the dielectric layer made of urethane resin (surface resistance: $10^{12}\Omega$) is formed on the inner layer made of chloroprene rubber or the like having an intermediate resistance. The dielectric layer is coated with a carbon-dispersed silicon solvent paint (surface resistance: $10^5$–$10^6$) having a specific resistivity lower than that of the dielectric layer.

The conductive transfer belt disclosed in Japanese Patent Application Laid-Open No. 2000-10417 has the conductive elastic layer, the conductive intermediate layer having at least one conductive reinforcing layer containing any one of urethane resin, urea resin, and urethane-urea resin, and the conductive protection layer.

However, ionic-conductive rubber uniform in its electric resistance value does not have a high elastic modulus. On the other hand, it is difficult to allow the above-described resin having a high elastic modulus to be ionic-conductive. The electric resistance of the electroconductive rubber and the ionic-conductive rubber is adjusted by adding an electroconductive agent such as carbon black to the main component thereof. Thus both have a problem that the electric resistance varies in dependence on a portion thereof, i.e., is nonuniform in the electric resistance thereof.

The transfer belt of three-layer structure disclosed in Japanese Patent Application Laid-Open No. 7-295391 is intended to suppress separation discharge and provide the transfer belt which can deliver paper favorably, but not high in its elastic modulus and nonuniform in its electric resistance.

The following description is made in the specification of the conductive transfer belt disclosed in Japanese Patent Application Laid-Open No. 2000-10417: "The conductive substance to be contained in the conductive layer is not specifically limited, . . . the conductive carbon black and the ionic-conductive substance are added to the conductive reinforcing layer. (paragraph [0030])". Apparently, the electroconductive agent consisting of the carbon black is added to the conductive reinforcing layer containing the ionic-conductive substance. Therefore the conductive transfer belt has room for improvement of the uniformity of its electric resistance.

SUMMARY OF THE INVENTION

The present invention has been made in view of the above-described problems. Therefore it is an object of the present invention to provide a conductive belt having a high elastic modulus, and thus having little variation in its moving speed to cope with a recent high-speed operation of a printer or the like, is uniform in its electric resistance, and thus can be suitably used in the technique of forming a high-quality image.

To achieve the object, there is provided a conductive belt having a base layer electroconductive and made of a resin, an intermediate layer ionic-conductive and made of an elastomer, and a surface coating layer, wherein a tensile modulus of elasticity of the base layer is set to not less than 500 Mpa, and a volume electric resistance value of the base layer is adjusted to not less than $10^6\Omega\cdot$cm nor more than $10^{11}\Omega\cdot$cm by adding an electroconductive agent to the resin; and the intermediate layer to be formed on an upper surface of the base layer has a JIS A hardness less than 70, a thickness not less than 50 μm nor more than 600 μm, and a volume electric resistance value not less than $10^8\Omega\cdot$cm nor more than $10^{14}\Omega\cdot$cm.

The volume electric resistance value of the electroconductive resinous base layer is adjusted to not less than $10^6\Omega\cdot$cm nor more than $10^{11}\Omega\cdot$cm by adding the electroconductive agent to the resin. The ionic-conductive intermediate layer made of the elastomer to be formed on the upper surface of the base layer has a volume electric resistance value not less than $10^8\Omega\cdot$cm nor more than $10^{14}\Omega\cdot$cm. It is possible to obtain the conductive belt having a proper conductivity and a uniform electric resistance by forming the ionic-conductive intermediate layer having high uniformity in its electric resistance in combination with the base layer having an electroconductivity imparted thereto by adding the electroconductive agent to the main component thereof and having a high elasticity and by restricting the electric resistance value of each of the base layer and the intermediate layer to a required range.

Therefore the conductive belt can be suitably used as a seamless intermediate transfer belt of a copying machine, a printer, and a facsimile.

It is preferable to impart the conductivity to the base layer by adding only the electroconductive agent to the resin.

The tensile modulus of elasticity of the base layer of the conductive belt is set to not less than 500 Mpa. Therefore it is possible to restrain an elongation of the conductive belt and reduce a change in the moving speed thereof. Further the conductive belt has an electroconductivity adjusted to a fixed range. Thus when the conductive belt is used as a transfer belt, it is possible to preferably transfer a toner image to paper.

If the tensile modulus of elasticity is less than 500 Mpa, the belt speed fluctuates greatly. Thus a preferable image cannot be obtained. It is more favorable that the tensile modulus of elasticity is not less than 1000 Mpa.

The conductive belt of the present invention has the ionic-conductive intermediate layer whose volume electric resistance value is adjusted to the above-described fixed range. Therefore the conductive belt is uniform in its electric resistance. In addition, since the JIS A hardness of the intermediate layer is set to less than 70, the conductive belt has a large transfer nip width, thus forming a preferable image. If the JIS A hardness of the intermediate layer is more than 70, the intermediate layer has a high volume resistivity or a small transfer nip width, thus forming a deteriorated image. It is favorable that the intermediate layer has the JIS A hardness less than 60.

The reason the thickness of the intermediate layer is not less than 50 μm is as follows: If the thickness of the intermediate layer is less than 50 μm, the intermediate layer has a variation in the surface electric resistance thereof or the surface hardness of the conductive belt is high. Thereby the transfer nip width becomes small. If the thickness of the intermediate layer is more than 600 μm, the total thickness of the conductive belt is so large that a problem occurs in design or the intermediate layer may separate from the base layer. Therefore the thickness of the intermediate layer is favorably less than 600 μm and more favorably not less than 100 μm nor more than 400 μm.

As the intermediate layer, it is possible to use a known ionic-conductive rubber that allows the intermediate layer to have the above-described fixed range. Alternatively, the intermediate layer may be ionic-conductive by adding an ionic-conductive agent to the main component thereof.

It is preferable that the intermediate layer is composed of a polyurethane elastomer formed by hardening the isocyanate-terminated prepolymer obtained from a polyol containing polypropylene glycol or/and hydroxyl-terminated liquid rubber as a main component thereof and aromatic diisocyanate with a hardening agent such as aromatic diamine or/and a polyol. Thereby it is easy to allow the intermediate layer to have a low hardness and impart flame-retardant property thereto. Further it is possible to make the cost of the conductive belt comparatively low.

Polyols and molecular amount-adjusting additives may be added to the polyurethane elastomer.

As the hydroxyl-terminated liquid rubber, it is possible to use hydroxyl-terminated liquid polybutadiene, hydroxyl-terminated liquid polyisoprene, hydroxyl-terminated liquid styrene-butadiene rubber, hydroxyl-terminated liquid acrylonitrile-butadiene rubber, liquid poly(oxypropylene) glycol, liquid poly(oxytetramethylene)glycol, liquid polyolefin glycol, and hydroxyl-terminated liquid silicone rubber and the like. Of these hydroxyl-terminated liquid rubbers, the hydroxyl-terminated liquid polybutadiene is most favorably used in consideration of balance of property.

As the polyols, for the reason of property, a polyol containing phosphorus and hydroxyl-terminated liquid rubber such as hydroxyl-terminated liquid polybutadiene and the like are preferable. The polyols can be used singly or in combination thereof.

It is preferable to form the isocyanate-terminated prepolymer by mixing the reactant of polypropylene glycol and aromatic diisocyanate with the reactant of the polyol containing the hydroxyl-terminated liquid rubber as its main component and the aromatic diisocyanate. Thereby it is possible to reduce a variation of the electric resistance to a higher extent.

The isocyanate-terminated prepolymer is formed of (1) the reactant of the polypropylene glycol and the aromatic diisocyanate, (2) the reactant of the polyol containing the hydroxyl-terminated liquid rubber as its main component and the aromatic diisocyanate, and (3) the product of a reaction of a mixture of the polypropylene glycol and the polyol containing the hydroxyl-terminated liquid rubber as its main component and the aromatic diisocyanate.

It is preferable to add a reactive flame-retardant compound such as a reactive phosphorous compound or a reactive halogen compound to the main component (elastomer) of the intermediate layer. By adding the reactive flame-retardant compound thereto, it is possible to impart flame-retardant property to the intermediate layer and reduce the problem of bleed-caused contamination of a photosensitive drum or attachment of toner thereto.

It is possible to add flame-retardant agents such as phosphate ester, red phosphorous, magnesium hydroxide, aluminum hydroxide, flame-retardant polymer graft polyol to the main component of the intermediate layer.

An electroconductivity is auxiliarily imparted to the intermediate layer ionic-conductive and made of the elastomer by adding an electroconductive agent to the elastomer. Supposing that a volume electric resistivity of the intermediate layer to which the electroconductivity is auxiliarily imparted is indicated by R at a voltage of 500V; a temperature of 23° C., and a relative humidity of 55%, a volume electric resistivity of the intermediate layer not containing the electroconductive agent is indicated by R1 at the voltage of 500V, the temperature of 23° C.; the relative humidity of 55%; and $\mathrm{Log}(R) - \mathrm{Log}(R1) = \mathrm{Log}(R2)$, it is preferable that the electroconductive agent is auxiliarily added to the elastomer in a condition of $0.1 \leq \mathrm{Log}(R2) \leq =5$, favorably $0.2 \leq =\mathrm{Log}(R2) \leq =3$, and more favorably $0.3 \leq \mathrm{Log}(R2) \leq 2$.

If Log(R2) is smaller than 0.1, the intermediate layer has a small effect of stabilizing the electric resistance for environment. If Log(R2) is larger than five, the intermediate layer has a large variation in its electric resistance.

As described above, it is possible to auxiliarily impart the conductivity to the ionic-conductive intermediate layer by adding the electroconductive agent to the elastomer in a range in which there is no variation in its electric resistance. Thereby it is possible to improve the dependency of the electric resistance thereof on environment.

As the resins for the base layer, it is possible to use polyimide resin, polyamide-imide resin, polyether imide resin, silicon imide resin, urethane imide resin, polyurethane resin, polyurea resin, epoxy resin, and melanin resin, unsaturated polyester resins, and vinyl ester resins and the like. The polyimide resin, the polyamide-imide resin, the polyurethane resin, and the polyurea resin are more favorable. The polyamide-imide resin is most favorable.

As the electroconductive agent to be added to the resin forming the base layer, it is possible to use carbon black such as ketjen black, furnace black, acetylene black; conductive metal oxides such as zinc oxide, potassium titanate, antimony-doped titanium oxide, tin oxide, and graphite; and carbon fiber and the like.

The amount of the electroconductive agent to be added to the resin forming the base layer to allow the base layer to have the volume electric resistance value in the above-described range is in the range of one part by weight to 50 parts by weight and favorably in the range of three parts by weight to 40 parts by weight for 100 parts by weight of a resinous solid content, although it depends on the kind of the electroconductive agent and the kind of the resin to be used to form the base layer.

It is favorable that the thickness of the base layer is set to not less than 20 μm nor more than 400 m. If the thickness of the base layer is set to less than 20 μm, there is a large variation in the belt speed. Consequently a preferable image cannot be obtained. On the other hand, if the thickness of the base layer is set to more than 400 μm, the base layer is so rigid that there is a possibility that the base layer cracks. It is more favorable that the thickness of the base layer is set to not less than 50 μm nor more than 300 μm.

Because the conductive belt has the surface coating layer, toner particle can be smoothly transferred to paper when the conductive belt is used as a transfer belt.

As the material for the surface coating layer, it is possible to use known materials made of a rubber, an elastomer, or a resin, capable of reducing a friction resistance and improving cleaning performance of toner remaining thereon by reducing its surface roughness. Thus it is possible to use urethane paint, acrylic paint, amide paint, epoxy paint, silicon paint, and fluorine paint and the like. The urethane paint, the acrylic paint and the fluorine paint can be suitably used. It is possible to reduce the friction resistance of the surface coating layer to a higher extent by adding to the paint a fluorine lubricant of polytetrafluoroethylene or a copolymer of tetrafluoroethylene and perfluoroalkylvinyl ether or a dispersion thereof.

It is preferable that the surface coating layer is non-electroconductive. Thereby it is possible to prevent the surface electric resistance from being locally low or high.

The surface coating layer is ionic-conductive. It is preferable that its volume electric resistance value is not less than $10^8 \Omega \cdot cm$ nor more than $10^{15}$ $\Omega \cdot cm$, when 500V is applied thereto to accomplish reception and transfer of toner favorably. However the surface coating layer may have insulating property.

It is favorable that the thickness of the surface coating layer is not less than 1 μm nor more than 50 μm. If the thickness of the surface coating layer is less than 1 μm, the surface coating layer is worn during use and has a inferior toner particle separation performance. On the other hand, if the thickness of the surface coating layer is more than 50 μm, it takes time and labor to form the surface coating layer and thus the cost of the material for the intermediate transfer belt is high. It is more favorable that the thickness of the surface coating layer is set to not less than 3 μm nor more than 30 μm.

The base layer is composed of a seamless belt substrate formed by applying it to a surface of a cylindrical die and hardening it. The intermediate layer is formed on the surface of the base layer by applying a material to the surface of the base layer and hardening it. The surface coating layer is formed on the surface of the intermediate layer by applying a material to the surface of the intermediate layer and hardening it. It is preferable that the base layer is composed of the centrifugally molded seamless belt substrate.

That is, the known methods can be used to produce the conductive belt of the present invention. The conductive belt can be produced at a low cost by using the following methods:

A method of centrifugally forming the conductive belt in the order of the surface coating layer, the intermediate layer, and the base layer.

A method of centrifugally forming the conductive belt in the order of the intermediate layer and the base layer, taking out a molded product thereof from a molding die, and then applying the material for the surface coating layer to the surface of the intermediate layer.

A method of centrifugally forming only the base layer, then taking out a molded product from a molding die, then applying the material for the intermediate layer to the surface of the base layer, and then applying the material for the surface coating layer to the surface of intermediate layer.

It is preferable to form the conductive belt in the order of the base layer, the intermediate layer, and the surface coating layer by repeating application of materials and hardening thereof to simplify the manufacturing process.

A roll coater, a bar coat, spray coat electrostatic deposition, dip coating, and a dispenser are used to form the base layer, the intermediate layer, and the surface coating layer by application of materials. As the method of forming the base layer and the intermediate layer by application of the materials, the dispenser is preferably used because it is necessary to apply the materials in a comparatively large thickness. As the method of forming the surface coating layer by application of the material, the electrostatic deposition is preferably used because it is necessary to apply the material uniformly and comparatively thinly.

DETAILED DESCRIPTION OF THE PREFERRED EMBODIMENTS

The embodiments of the present invention will be described below.

Figure 1:
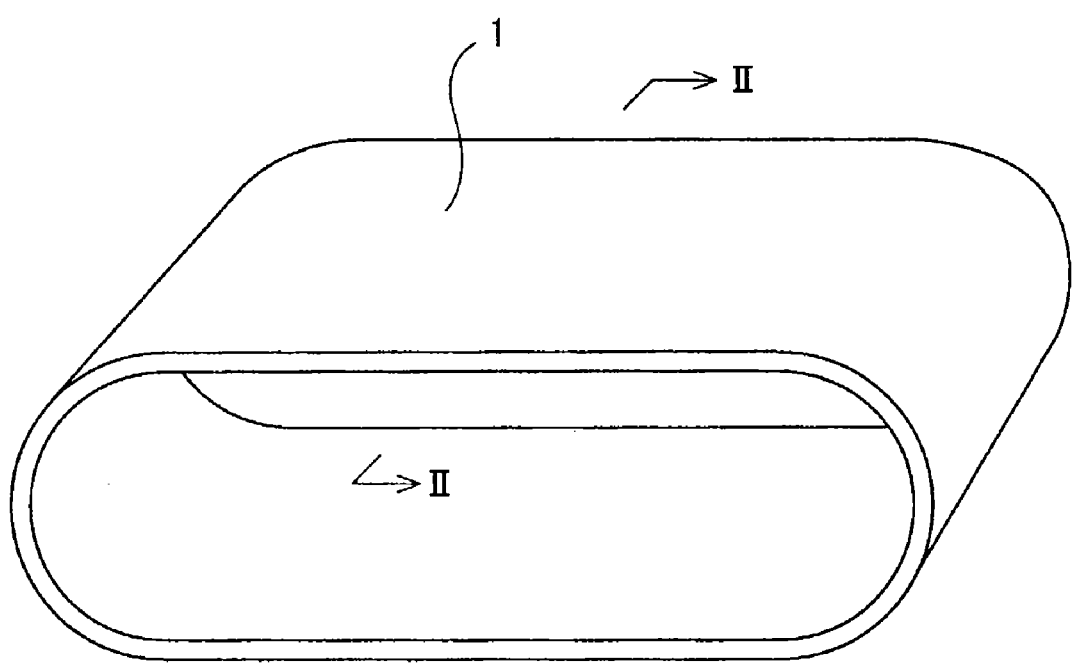
FIG. 1 is a perspective view showing an intermediate transfer belt according to an embodiment of the present invention.

FIG. 1 is a perspective view showing an intermediate transfer belt 1 according to an embodiment of the present invention. The intermediate transfer belt 1 is entirely approximately cylindrical (endless). Since the intermediate transfer belt 1 is flexible and deformable by gravity, it is capable of having various configurations. FIG. 1 shows the entire configuration (section of intermediate transfer belt 1 in travel direction is approximately elliptic) of the intermediate transfer belt 1, supposing that the intermediate transfer belt 1 is stretched between two shafts.

Figure 2:
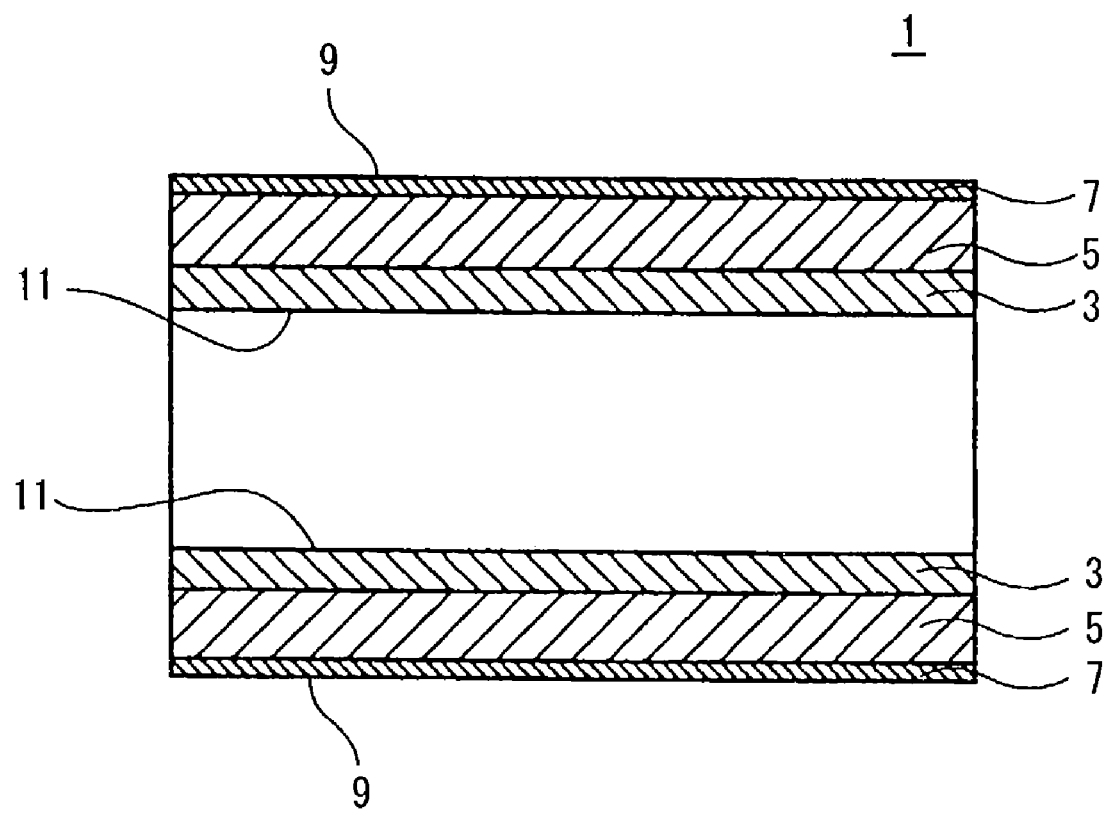
FIG. 2 is a sectional view taken along a line II—II of FIG. 1.

FIG. 2 is a sectional view taken along a line II—II of FIG. 1. The intermediate transfer belt 1 has a base layer 3, an intermediate layer 5, and a surface coating layer 7. A powdery toner attaches to a peripheral surface 9 of the intermediate transfer belt 1. An inner peripheral surface 11 of the intermediate transfer belt 1 contacts a driving shaft and a driven shaft directly while the intermediate transfer belt 1 is rotating.

The base layer 3 is a rigid layer resinous and electroconductive. More specifically, the base layer 3 contains polyamide-imide resin as its main component. The tensile modulus of elasticity of the base layer 3 is 2500 Mpa. Carbon black which is an electroconductive agent is added to the main component of the base layer 3 to adjust the volume electric resistance value thereof to $3.2 \times 10^9 \Omega \cdot cm$. The thickness of the base layer 3 is set to 100 μm.

The intermediate layer 5 is an elastic layer elastomeric and ionic-conductive. That is, the intermediate layer 5 is made of a polyurethane elastomer formed by hardening a main agent shown below with a hardening agent. More specifically, the main component is isocyanate-terminated prepolymer formed by mixing the reactant of polypropylene glycol and aromatic diisocyanate with the reactant of polyol containing a hydroxyl-terminated liquid rubber as a main component thereof and the aromatic diisocyanate. The hardening agent is obtained from hydroxyl-terminated liquid polybutadiene, phosphorous-containing polyol, and aromatic diamine. The intermediate layer 5 has a JIS A hardness of 57, a thickness of 300 m, and a volume electric resistance value of $5.2 \times 10^{12}$ Ω·cm.

The surface coating layer 7 is made of a resinous material containing urethane as its main component. The surface coating layer 7 has a thickness of 5 μm and a volume electric resistance value of $4.6 \times 10^{13}$ Ω·cm. The surface coating layer 7 is non-electroconductive.

In addition to the above-described embodiment, by appropriately altering materials and the thickness of each layer, conductive belts of various modes can be produced.

Figure 3:
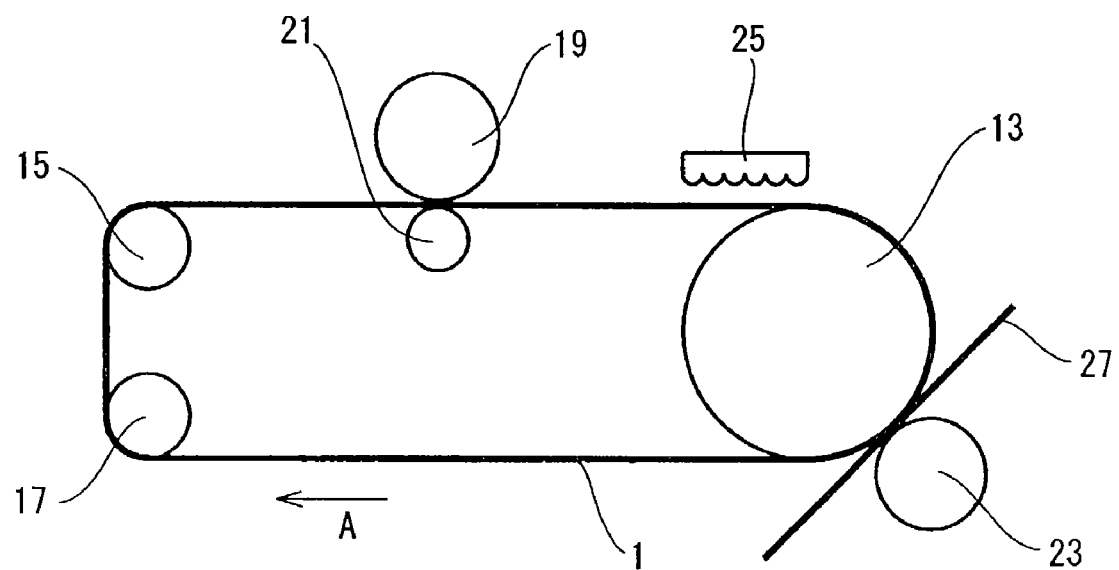
FIG. 3 is an illustrative front view showing an image-forming apparatus incorporating the intermediate transfer belt 1 shown in FIG. 1.

FIG. 3 is an illustrative front view showing an image-forming apparatus incorporating the intermediate transfer belt 1 shown in FIGS. 1 and 2. The image-forming apparatus has a driving shaft 13, a first driven shaft 15, a second driven shaft 17, a photosensitive drum 19, a transfer roll 21, a silicon sponge roll 23, and a heater 25. The intermediate transfer belt 1 is stretched on the driving shaft 13, the first driven shaft 15, and the second driven shaft 17. The intermediate transfer belt 1 rotates in the direction shown with the arrow A.

In forming an image by using the image-forming apparatus, initially, a developing roll (not shown) supplies the photosensitive drum 19 with toner to form a toner image. Thereafter the toner image is transferred to the intermediate transfer belt 1 passing between the photosensitive drum 19 and the transfer roll 21. Then the heater 25 heats the toner. By the heating, a volatile component of the toner volatilizes to some extent, and binder resin of toner particle melts. Thereafter the toner image is transferred to an object (paper) 27 supplied between the intermediate transfer belt 1 and the sponge roll 23. The toner image is fixed to the object to form an image. Although FIG. 1 shows one photosensitive drum 19, in the case of color printing, the photosensitive drum 19 is prepared for each of black, magenta, cyan, and yellow.

Although the powdery toner is used in the above-described embodiment, the conductive belt can be mounted in an image forming apparatus using liquid toner.

The base layer 3 is composed of a centrifugally molded seamless belt substrate. The intermediate layer 5 is formed on the surface of the base layer 3 by applying a material to the surface of the base layer 3 and hardening it. The surface coating layer 7 is formed on the surface of the intermediate layer 5 by applying a material to the surface of the intermediate layer 5 and hardening it. The base layer 3 may be composed of the seamless belt substrate by applying it by a dispenser and drying and hardening it during rotation. The intermediate layer 5 may be formed by applying the material to the surface of the base layer 3 by the dispenser and drying and hardening it during rotation. The dispenser is constituted of a syringe and a needle. Paste filled in the syringe is pushed out from the needle.

A conductive seamless belt of each of examples 1 through 7 and comparison examples 1 and 2 was prepared as an intermediate transfer belt.

TABLE 1

| Example 1 | Surface coating layer | Intermediate layer | Base layer |
|---|---|---|---|
| Material | Coating 1 | Intermediate layer 1 | Base layer 1 |

TABLE 1-continued

| | Surface coating layer | Intermediate layer | Base layer |
|---|---|---|---|
| Molding method | Electrostatic deposition | Centrifugal molding | Centrifugal molding |
| Thickness (μ) | 5 | 300 | 300 |
| Tensile modulus of elasticity (Mpa) | — | — | 640 |
| Hardness (JIS A) | — | 52 | — |
| Volume resistivity (Ω · cm) [500 V] | $4.6 \times 10^{13}$ | $2.0 \times 10^{12}$ | $3.2 \times 10^{8}$ |
| Ionic-conductive/electro-conductive | Ionic-conductive | Ionic-conductive | Electro-conductive |

| Example 2 | Surface coating layer | Intermediate layer | Base layer |
|---|---|---|---|
| Material | Coating 1 | Intermediate layer 2 | Base layer 2 |
| Molding method | Electrostatic deposition | Bar coat | Centrifugal molding |
| Thickness (μ) | 5 | 500 | 82 |
| Tensile modulus of elasticity (Mpa) | — | — | 7300 |
| Hardness (JIS A) | — | 60 | — |
| Volume resistivity (Ω · cm) [500 V] | $4.6 \times 10^{13}$ | $9.7 \times 10^{12}$ | $8.8 \times 10^{8}$ |
| Ionic-conductive/electro-conductive | Ionic-conductive | Ionic-conductive | Electro-conductive |

| Comparison Example 1 | Surface coating layer | Intermediate layer | Base layer |
|---|---|---|---|
| Material | Coating 1 | — | Base layer 2 |
| Molding method | Electrostatic deposition | — | Centrifugal molding |
| Thickness (μ) | 5 | — | 82 |
| Tensile modulus of elasticity (Mpa) | — | — | 7300 |
| Hardness (JIS A) | — | — | — |
| Volume resistivity (Ω · cm) [500 V] | $4.6 \times 10^{13}$ | — | $8.8 \times 10^{8}$ |
| Ionic-conductive/electro-conductive | Ionic-conductive | — | Electro-conductive |

| Comparison Example 2 | Surface coating layer | Intermediate layer | Base layer |
|---|---|---|---|
| Material | Coating 1 | — | Base layer 3 |
| Molding method | Electrostatic deposition | — | Centrifugal molding |
| Thickness (μ) | 5 | — | 300 |
| Tensile modulus of elasticity (Mpa) | — | — | 450 |
| Hardness (JIS A) | — | — | — |
| Volume resistivity (Ω · cm) [500 V] | $4.6 \times 10^{13}$ | — | $4.2 \times 10^{8}$ |
| Ionic-conductive/electro-conductive | Ionic-conductive | — | Electro-conductive |

TABLE 2

| Example 3 | Surface coating layer | Intermediate layer | Base layer |
|---|---|---|---|
| Material | Coating 1 | Intermediate layer 3 | Base layer 4 |
| Molding method | Electrostatic deposition | Knife coating | Centrifugal molding |
| Thickness (μ) | 5 | 300 | 100 |
| Tensile modulus of elasticity (Mpa) | — | — | 2500 |
| Hardness (JIS A) | — | 58 | — |
| Volume resistivity (Ω · cm) [500 V] | $4.6 \times 10^{13}$ | $5.2 \times 10^{12}$ | $3.2 \times 10^{9}$ |
| Ionic-conductive/electro-conductive | Ionic-conductive | Ionic-conductive | Electro-conductive |

| Example 4 | Surface coating layer | Intermediate layer | Base layer |
|---|---|---|---|
| Material | Coating 1 | Intermediate layer 4 | Base layer 4 |
| Molding method | Electrostatic deposition | Knife coating | Centrifugal molding |
| Thickness (μ) | 5 | 300 | 100 |
| Tensile modulus of elasticity (Mpa) | — | — | 2500 |
| Hardness (JIS A) | — | 57 | — |
| Volume resistivity (Ω · cm) [500 V] | $4.6 \times 10^{13}$ | $1.0 \times 10^{13}$ | $3.2 \times 10^{9}$ |
| Ionic-conductive/electro-conductive | Ionic-conductive | Ionic-conductive | Electro-conductive |

| Example 5 | Surface coating layer | Intermediate layer | Base layer |
|---|---|---|---|
| Material | Coating 1 | Intermediate layer 5 | Base layer 4 |
| Molding method | Electrostatic deposition | Knife coating | Centrifugal molding |
| Thickness (μ) | 5 | 300 | 100 |
| Tensile modulus of elasticity (Mpa) | — | — | 2500 |
| Hardness (JIS A) | — | 63 | — |
| Volume resistivity (Ω · cm) [500 V] | $4.6 \times 10^{13}$ | $6.4 \times 10^{13}$ | $3.2 \times 10^{9}$ |
| Ionic-conductive/electro-conductive | Ionic-conductive | Ionic-conductive | Electro-conductive |

| Example 6 | Surface coating layer | Intermediate layer | Base layer |
|---|---|---|---|
| Material | Coating 1 | Intermediate layer 6 | Base layer 4 |
| Molding method | Electrostatic deposition | Knife coating | Centrifugal molding |
| Thickness (μ) | 5 | 300 | 100 |
| Tensile modulus of elasticity (Mpa) | — | — | 2500 |
| Hardness (JIS A) | — | 64 | — |
| Volume resistivity (Ω · cm) [500 V] | $4.6 \times 10^{13}$ | $3.2 \times 10^{12}$ | $3.2 \times 10^{9}$ |
| Ionic-conductive/electro-conductive | Ionic-conductive | Ionic-conductive | Electro-conductive |

TABLE 2-continued

| Example 7 | Surface coating layer | Intermediate layer | Base layer |
|---|---|---|---|
| Material | Coating 2 | Intermediate layer 7 | Base layer 5 |
| Molding method | Electrostatic deposition | dispenser coating | dispenser coating |
| Thickness (μ) | 8 | 270 | 80 |
| Tensile modulus of elasticity (Mpa) | — | — | 2700 |
| Hardness (JIS A) | — | 50 | — |
| Volume resistivity (Ω · cm) [500 V] | $2.4 \times 10^{11}$ | $1.8 \times 10^{10}$ | $1.2 \times 10^{8}$ |
| Ionic-conductive/electro-conductive | Ionic-conductive | Ionic-conductive | electro-conductive |

In tables 1 and 2, the formulation of the base layer 1, the base layer 2, the base layer 3, the base layer 4, and the base layer 5 are shown in tables 3, 4, 5, 6, and 7 respectively. The formulation of the intermediate layer 1, the intermediate layer 2, the intermediate layer 3, the intermediate layer 4, the intermediate layer 5, the intermediate layer 6, and the intermediate layer 7 are shown in tables 8, 9, 10, 11, 12, 13 and 14 respectively. The formulation of the surface coating layer 1 and the surface coating layer 2 is shown in tables 15 and 16 respectively shown below. The volume resistivity was measured at an applied voltage of 500V, a temperature of 23° C., and a relative humidity of 55%.

TABLE 3

Base Layer 1

| | | Parts by weight |
|---|---|---|
| Main agent | Isocyanate-terminated prepolymer (1) | 70.2 |
| Hardening agent | Aromatic diamine | 10 |
| | CB toner | 16.4 |
| | Anti-foaming agent | 1.8 |
| | Xylene | 30 |

In table 3, the isocyanate-terminated prepolymer (1) (produced by Sumika Beier Urethane Co. Ltd.) contained 5.3% of NCO and obtained from polypropylene glycol and tolylene diisocyanate. As the aromatic diamine, dimethyl thiotoluene diamine (produced by Albemal Corp). The CB toner (produced by Mikuni Shikiso Co. Ltd.) contained toluene and ketjen black dispersed therein. The anti-foaming agent was acrylic/vinyl ether copolymer (produced by Kyoei Kagaku Co. Ltd.).

TABLE 4

Base Layer 2

| | Parts by weight |
|---|---|
| Polyimide varnish | 100 |
| Acetylene black | 5.4 |
| N, N-diacetyl acetamide | 50 |

In table 4, as the polyimide varnish, U-varnish-S (produced by Ube Kosan Co. Ltd.) was used.

TABLE 5

Base Layer 3

|  |  | Parts by weight |
|---|---|---|
| Main agent | Isocyanate-terminated prepolymer (1) | 74 |
| Hardening agent | Aromatic diamine | 10 |
|  | Polypropylene glycol (Sumiphene 3600) | 5 |
|  | CB toner | 16.4 |
|  | Anti-foaming agent | 1.8 |
|  | Xylene | 30 |

TABLE 6

Base Layer 4

|  | Parts by weight |
|---|---|
| Polyamideimide varnish | 100 |
| CB toner (2) | 40 |
| N-methyl-2-pyrrolidone (reagent) | 44 |

In table 6, the polyamideimide varnish (solid content: 27%) was synthesized by using a known method. The CB toner (2) was prepared by using 10 g of furnace black, 2 g of a dispersion, and 88 g of N-methyl-2-pyrrolidone by using a beads mill.

TABLE 7

Base Layer 5

|  | Parts by weight |
|---|---|
| Polyamideimide varnish | 100 |
| CE toner (2) | 43 |
| N-methyl-2-pyrrolidone (reagent) | 44 |

In table 7, the Polyamideimide varnish, the CB toner (2) and N-methyl-2-pyrrolidone(reagent) were the same as those described in table 6.

TABLE 8

Intermediate Layer 1

|  |  | Parts by weight |
|---|---|---|
| Main agent | Isocyanate-terminated prepolymer (2) | 54.5 |
| Hardening agent | Polypropylene glycol | 18.1 |
|  | Aromatic diamine | 4.2 |
|  | Catalyst | 1 |
|  | Anti-foaming agent | 0.14 |
|  | Xylene | 73 |

In table 8, the polypropylene glycol was Sumiphene 3600 (produced by Sumika Beier Urethane Co. Ltd.). The aromatic diamine and the anti-foaming agent were the same as those described in table 3. As the catalyst, zinc naphthenate (8%) was used.

TABLE 9

Intermediate Layer 2

|  |  | Parts by weight |
|---|---|---|
| Main agent | Isocyanate-terminated prepolymer (2) | 54.5 |
| Hardening agent | Polypropylene glycol | 18.1 |
|  | Aromatic diamine | 4.2 |
|  | Catalyst | 1 |
|  | Anti-foaming agent | 0.14 |
|  | Xylene | 100 |
|  | Flame-retardant agent A | 3.75 |
|  | Flame-retardant agent B | 26.3 |

In table 9, the isocyanate-terminated prepolymer (2), the polypropylene glycol, the aromatic diamine, and the anti-foaming agent were the same as those shown in table 8. The flame-retardant agent A was Hishiguard EL (produced by Nippon Kagaku Kogyo Co. Ltd.). The flame-retardant agent B was Fine Mag SN (produced by Tateho Kagaku Co. Ltd.).

TABLE 10

Intermediate Layer 3

|  |  | Parts by weight |
|---|---|---|
| Main agent | Isocyanate-terminated prepolymer (3) | 57.5 |
|  | isocyanate-terminated prepolymer (4) | 23.1 |
| Hardening agent | Phosphorus-containing polyol | 10.6 |
|  | Aromatic diamine | 1 |
|  | Hydroxyl-terminated liquid poly-butadiene | 8.5 |

In table 10, the isocyanate-terminated prepolymer (3) (Poly bd HTP-9, produced by Idemitsu Sekiyu Kagaku Co. Ltd.) contained 9 wt % of NCO and was the reactant of hydroxyl-terminated liquid polybutadiene and aromatic diisocyanate. The isocyanate-terminated prepolymer (4) (produced by Sumika Beier Urethane Co. Ltd.) was the product of polypropylene glycol and the aromatic diisocyanate and contained 4 wt % of NCO. The phosphorus-containing polyol was Firoll 6 (reactive phosphorus-containing polyol, produced by Akuzo-Kashima Co. Ltd.). As the aromatic diamine, dimethyl thiotoluene diamine (produced by Albemal Corp) was used. The hydroxyl-terminated liquid polybutadiene was Poly bd R-45HT (produced by Idemitsu Sekiyu Kagaku Co. Ltd.).

TABLE 11

Intermediate Layer 4

|  |  | Parts by weight |
|---|---|---|
| Main agent | Isocyanate-terminated prepolymer (5) | 87.6 |
| Hardening agent | Phosphorus-containing polyol | 9.4 |
|  | Aromatic diamine | 2.9 |

In table 11, the isocyanate-terminated prepolymer (5) (produced by Sumika Beier Urethane Co. Ltd.) containing 6 wt % of NCO was the product obtained by a reaction of a mixture of polypropylene glycol and hydroxyl-terminated liquid polybutadiene and aromatic diisocyanate. The phosphorus-containing polyol was Firoll 6 (reactive phosphorus-containing polyol, produced by Akuzo-Kashima Co. Ltd.).

As the aromatic diamine, dimethyl thiotoluene diamine (produced by Albemal Corp) was used.

TABLE 12

Intermediate Layer 5

| | | Parts by weight |
|---|---|---|
| Main agent | Isocyanate-terminated prepolymer (3) | 71.3 |
| Hardening agent | Phosphorus-containing polyol | 13.0 |
| | Aromatic diamine | 2.6 |
| | Polypropylene glycol | 13.0 |

In table 12, the isocyanate-terminated prepolymer (3) was the same as that shown in table 10. The phosphorus-containing polyol was Firoll 6 (reactive phosphorus-containing polyol, produced by Akuzo-Kashima Co. Ltd.). As the aromatic diamine, dimethyl thiotoluene diamine (produced by Albemal Corp) was used. The polypropylene glycol was Sumiphene 3600 (produced by Sumika Beier Urethane Co. Ltd.).

TABLE 13

Intermediate Layer 6

| | | Parts by weight |
|---|---|---|
| Main agent | Isocyanate-terminated prepolymer (3) | 67.0 |
| Hardening agent | Phosphorus-containing polyol | 15.0 |
| | CB toner (3) | 18.0 |

In table 13, the isocyanate-terminated prepolymer (3) was the same as that shown in table 10. The phosphorus-containing polyol was Firoll 6 (reactive phosphorus-containing polyol, produced by Akuzo-Kashima Co. Ltd.). The CB toner (3) was prepared by kneading 10 g of acetylene black, 2 g of a dispersion, and 50 g of hydroxyl-terminated liquid polybutadiene (Poly bd R-45HT) by three rolls. The $\log(R)=12.5$ ($R=3.2\times10^{12}$), the $\log(R1)=14.3$ ($R1=2.0\times10^{14}$), and the $\log(R2)=1.8$. A conductivity was auxiliarily imparted to the intermediate layer 6 by adding the electro-conductive agent to the main component thereof.

TABLE 14

Intermediate Layer 7

| | | Parts by weight |
|---|---|---|
| Main agent | Isocyanate-terminated prepolymer (6) | 54.7 |
| Hardening agent | Polyether polyol | 36.8 |
| | Aromatic diamine | 6.9 |
| | Anti-foaming agent | 1.5 |

In table 14, the isocyanate-terminated prepolymer (6) (produced by Sumika Beier Urethane Co. Ltd.) contained 7.0 wt % of NCO and obtained from polypropylene glycol and tolylene diisocyanate. The polyether polyol was Accliom 6300 (produced by Sumika Beier Urethane Co. Ltd.). The aromatic diamine and the anti-foaming agent were the same as those described in table 8.

TABLE 15

Surface Coating Layer 1

| | Parts by weight |
|---|---|
| Urethane emulsion | 26.7 |
| Fluorine polymer dispersion | 30.2 |
| Leveling agent | 2.5 |
| Anti-foaming agent | 0.5 |
| Water | 17.8 |
| Crosslinking agent | 4.0 |

In table 15, the urethane emulsion was polyurethane emulsion having a solid content at 30%. The fluorine polymer dispersion was Fulon AD1 (produced by Asahi Glass Co. Ltd.). The leveling agent was a mixture of a non-ionic surface active agent/an anion surface active agent. The anti-foaming agent was a specific silicon anti-foaming agent (produced by Kyoei Kagaku Co. Ltd.). The crosslinking agent was epoxysilane.

TABLE 16

Surface Coating Layer 2

| | Parts by weight |
|---|---|
| fluoro rubber emulsion paint | 100 |
| hardening agent | 5 |

In table 16, as the fluoro rubber emulsion paint, GLS-213F (produced by Daikin Co. Ltd.) was used, and as the hardening agent, GL-200 (produced by Daikin Co. Ltd.) was used The following evaluations were made on the intermediate transfer belt of each of the examples 1 through 7 and the comparison examples 1 and 2. The results are shown in tables 17 and 18.

Evaluation of Variation in Electric Resistance

The electric potential of the surface of each intermediate transfer belt was measured (5,000-point measurement) by a surface electrometer (produced by QEA Corp.) to compute a standard deviation/average value which was used as the index of uniformity of the electric resistance. When the standard deviation/average value is small, the variation in the electric resistance is small. It is desirable that the standard deviation/average value is smaller than 0.25.

Evaluation of Reduction Rate of Speed

Belts each having $\phi$ 168 mm and a width of 100 mm was spanned on two shafts which had $\phi$ 15 mm and which was processed to prevent slip. A driving shaft was rotated at a constant speed of 78 rpm, with a load of 10 kg applied by a weight to a driven shaft to measure the number of rotations of the driven shaft. Thereafter the number of rotations of the driven shaft was measured when the driven shaft was braked at a torque of 100 mNm to compute the reduction rate in the number of rotations of the driven shaft. The lower the reduction rate is, the less the deterioration extent of an image is. It is desirable that the reduction rate of speed is less than 0.5

TABLE 17

|  | Example 1 | Example 2 | Comparison example 1 | Comparison example 2 |
|---|---|---|---|---|
| Variation in electric resistance | 0.232 | 0.212 | 0.354 | 0.375 |
| Reduction rate of speed | 0.4 | 0.1 | 0.1 | 0.8 |

TABLE 18

|  | Example 3 | Example 4 | Example 5 | Example 6 | Example 7 |
|---|---|---|---|---|---|
| Variation in electric resistance | 0.208 | 0.220 | 0.216 | 0.243 | 0.236 |
| Reduction rate of speed | 0.1 | 0.1 | 0.1 | 0.1 | 0.1 |

As shown in FIGS. 17 and 18, in each of the intermediate transfer belt of the examples 1 through 7, the variation in the electric resistance thereof was smaller than 0.25, and the speed reduction rate thereof was smaller than 0.5. Therefore it is possible to reduce the change in the belt speed to cope with a high-speed operation of a printer developed in recent years. Further the intermediate transfer belt is uniform in its electric resistance. Thus the intermediate transfer belt can be used suitably for the technique of forming a high-quality image. The intermediate transfer belt of each of the examples 2 and 3 was very excellent because they were small in the variation in its electric resistance and speed reduction rate.

Each of the intermediate transfer belt of the comparison examples 1 and 2 was inferior because the variation in the electric resistance thereof was larger than 0.25. The intermediate transfer belt of the comparison example 2 was inferior because the speed reduction rate thereof was as large as 0.8.

As apparent from the foregoing description, the conductive belt of the present invention has the base layer which is the rigid resinous layer containing the electroconductive material, the intermediate layer which is an elastic layer made of an ionic-conductive elastomer, and the surface coating layer formed on the intermediate layer. The tensile modulus of elasticity of the base layer is set to a specified range. The volume electric resistance value of the base layer and that of the intermediate layer are set to a specified range respectively. Therefore it is possible to restrain the elongation of the conductive belt. Further the conductive belt has a high elasticity and a small variation in its surface electric resistance.

Accordingly, in the case where the conductive belt is used as the intermediate transfer belt of image forming apparatuses such as a printer, a copying apparatus, and a facsimile, it is possible to reduce a change in the speed of the conductive belt to cope with a recent high-speed operation thereof. Further the conductive belt is uniform in its electric resistance. Thus the conductive belt can be used suitably for the technique of forming a high-quality image.

The invention claimed is:

1. A conductive belt comprising:
an electroconductive base layer made of a resin;
an ionic-conductive intermediate layer made of an elastomer; and
a surface coating layer,
wherein a tensile modulus of elasticity of said base layer is set to not less than 500 Mpa, and a volume electric resistance value thereof is not less than $10^6 \Omega \cdot cm$ nor more than $10^{11} \Omega \cdot cm$;
said intermediate layer is formed on an upper surface of said base layer, has a JIS A hardness less than 70, a thickness not less than 50 μm nor more than 600 μm, and a volume electric resistance value not less than $10^8 \Omega \cdot cm$ nor more than $10^{14} \Omega \cdot cm$;
said intermediate layer is composed of a polyurethane elastomer containing a polyol containing polypropylene glycol or/and a hydroxyl-terminated liquid rubber moiety as a main component thereof and an aromatic moiety or/and a polyol moiety; and
said surface coating layer is made of a rubber, an elastomer, or a resin.

2. The conductive belt according to claim 1, wherein said polyurethane elastomer contains the polypropylene glycol polyol containing a hydroxyl-terminated liquid rubber moiety as the main component thereof and said aromatic moiety.

3. The conductive belt according to claim 1, wherein a thickness of said base layer is not less than 20 μm nor more than 400 μm; and said surface coating layer is non-electroconductive, has a thickness of not less than 1 μm nor more than 50 μm; and a volume electric resistance value of not less than $10^{10} \Omega \cdot cm$ nor more than $10^{15} \Omega \cdot cm$.

4. The conductive belt according to claim 1, wherein said ionic conductive intermediate layer further contains an electroconductive agent so that the intermediate layer has electroconductivity,
wherein that a volume electric resistance value of said intermediate layer to which said electroconductivity is auxiliarily imparted is indicated by R at a voltage of 500V, a temperature of 23° C., and a relative humidity of 55%; a volume electric resistance value of said intermediate layer not containing said electroconductive agent is indicated by R1 at the voltage of 500V, the temperature of 23° C., and the relative humidity of 55%; and Log(R)–Log(R1)=Log(R2),
said electroconductive agent is contained in said elastomer in a condition of $0.1 \leq Log(R2) \leq 5$.

5. The conductive belt according to claim 1, wherein said intermediate layer contains a reactive flame-retardant compound.

6. The conductive belt according to claim 1, wherein said conductive belt is a seamless belt that is used as an intermediate transfer belt of a copying apparatus, a printer, or a facsimile.

7. The conductive belt according to claim 1, wherein said base layer is composed of a centrifugally molded seamless belt substrate; said intermediate layer is formed on a surface of said base layer by applying a material to said surface of said base layer and hardening said material; and said surface coating layer is formed on a surface of said intermediate layer by applying a material to said surface of said intermediate layer and hardening said material.

8. The conductive belt according to claim 1, wherein said base layer is composed of a seamless belt substrate by applying said seamless belt substrate by a dispenser and drying and hardening said seamless belt substrate while said seamless belt substrate is being rotated; said intermediate layer is formed by applying a material to a surface of said base layer by said dispenser and drying and hardening said material while said material is being rotated; and said surface coating layer is formed on a surface of said intermediate layer by applying a material to said surface of said intermediate layer and hardening said material.

9. The conductive belt according to claim 1, wherein said tensile modulus of elasticity of the base layer is not less than 1000 MPa.

10. The conductive belt according to claim 1, wherein said thickness of the intermediate layer 100 to 400 μm.

11. The conductive belt according to claim 1, wherein a thickness of the base layer 50 to 300 μm.

12. The conductive belt according to claim 1, wherein a thickness of the surface coating layer is 3 to 30 μm.

* * * * *